(12) United States Patent
Campanini

(10) Patent No.: US 10,325,419 B2
(45) Date of Patent: Jun. 18, 2019

(54) PRINTING APPARATUS

(71) Applicant: CUSTOM S.p.A., Fontevivo (IT)

(72) Inventor: Alberto Campanini, Fidenza (IT)

(73) Assignee: CUSTOM S.p.A., Fontevivo (Parma) (IT)

( * ) Notice: Subject to any disclaimer, the term of this patent is extended or adjusted under 35 U.S.C. 154(b) by 0 days.

(21) Appl. No.: 15/572,659

(22) PCT Filed: May 9, 2016

(86) PCT No.: PCT/IB2016/052634
§ 371 (c)(1),
(2) Date: Nov. 8, 2017

(87) PCT Pub. No.: WO2016/181285
PCT Pub. Date: Nov. 17, 2016

(65) Prior Publication Data
US 2018/0158253 A1 Jun. 7, 2018

(30) Foreign Application Priority Data

May 12, 2015 (IT) .................... 102015000014843

(51) Int. Cl.
*G06F 17/00* (2019.01)
*G07B 15/04* (2006.01)
(Continued)

(52) U.S. Cl.
CPC ........... *G07B 15/04* (2013.01); *G06F 13/102* (2013.01); *G06K 7/10722* (2013.01);
(Continued)

(58) Field of Classification Search
CPC .... G06C 20/18; G07D 11/00; G07D 11/0018; G07D 11/0021; G07B 11/02; G07B 11/03; G06Q 20/18
See application file for complete search history.

(56) References Cited

U.S. PATENT DOCUMENTS 4,703,164 A 10/1987 Von Ballmoos
5,625,562 A 4/1997 Veeneman et al.
(Continued)

FOREIGN PATENT DOCUMENTS

WO 8905498 A1 6/1989

OTHER PUBLICATIONS

Internatinal Search Report and Written Opinion of the International Searching Authority Application No. PCT/IB2016/052634 Completed: Jul. 26, 2016; dated Aug. 5, 2016 12 pages.

*Primary Examiner* — Thien M Le
*Assistant Examiner* — April A Taylor
(74) *Attorney, Agent, or Firm* — Whitmyer IP Group LLC

(57) ABSTRACT

A printing apparatus is disclosed that is suitable for controlling a barred access, with a front port for inserting and expelling tickets, sensor means for reading a ticket introduced into the port, an input/output interface and thermal printing means controlled by an electronic processor including a memory that can contain a script including an instruction to activate the printing means in response to an input signal received from the sensor means or via the interface and an instruction to send an output signal via the interface in response to a signal emitted by sensor means. A computerized central system, arranged outside the printing apparatus for controlling the barred access, is associated with the printing apparatus by means of an initial system configurations that is simplified.

15 Claims, 2 Drawing Sheets

(51) Int. Cl.
    *G07B 15/02*       (2011.01)
    *G06F 13/10*       (2006.01)
    *G06K 7/10*        (2006.01)
    *G06K 7/14*        (2006.01)
    *H04N 1/00*        (2006.01)

(52) U.S. Cl.
    CPC ........... *G06K 7/1413* (2013.01); *G07B 15/02* (2013.01); *H04N 1/00435* (2013.01); *H04N 1/00694* (2013.01); *H04N 1/00734* (2013.01); *H04N 1/00973* (2013.01); *H04N 2201/0082* (2013.01)

(56) References Cited

U.S. PATENT DOCUMENTS

| | | | |
|---|---|---|---|
| 7,392,226 B1 | 6/2008 | Sasaki et al. | |
| 8,023,715 B2* | 9/2011 | Jones | G06Q 20/1085 382/135 |
| 8,229,821 B2* | 7/2012 | Mennie | G06K 9/033 705/16 |
| 9,129,271 B2* | 9/2015 | Jenrick | G07D 7/00 |
| 2011/0313893 A1 | 12/2011 | Weik, III | |

\* cited by examiner

PRINTING APPARATUS

TECHNICAL FIELD

The invention relates to a printing apparatus, in particular a writing and reading apparatus for printing and validating tickets, for example tickets used as parking permits for controlling a barred access.

BACKGROUND

Specifically but not exclusively, the invention can be usefully applied to controlling the entry and exit of vehicles or pedestrians through a given area, for example an area with payment for parking or transit, like a car park, a private road, or a zone with limited access.

The prior art comprises parking columns provided with a printing apparatus that is usable for managing the car park by means of parking permits in the form of printed tickets. The printing apparatus is able to emit a parking permit (i.e. print an entry ticket to the car park) and to read the parking permit (validating the ticket at the exit from the car park).

The printing apparatus is connected to the computerised central system controlling the car park or another system with barred access, to act in a coordinated manner with the various actuators and sensors of the car park, such as, for example, a closing bar, traffic lights, a ticket request pushbutton, a motor vehicle sensor, an automatic payment point, etc.

Known printing apparatuses, used in parking columns, nevertheless have the problem of requiring complex hardware configurations for installing in the entry/exit management system for managing controlled access to the car park, in particular for the logic connection of the printing apparatus to the peripheral unit that coordinates the various operations of the entry/exit management system.

Normally in fact, an external control unit has to be provided (for example a PLC or a dedicated logic card) with the instructions necessary for operating the management system for managing controlled access to the car park. Such instructions can comprise, for example, driving the barring means (bar, gate, etc), reading signals coming from the different sensors of the system (pushbuttons, vehicle presence sensors, ticket validation sensors, etc), piloting the traffic light system, etc.

SUMMARY

One object of the invention is to provide a printing apparatus that is able to overcome the aforesaid limits and drawbacks of the prior art.

One advantage is to make a printing apparatus that can pilot simply and immediately the various barred access operations.

One advantage is to provide a constructionally simple and cheap printing apparatus for printing tickets to be used as passes for entering or exiting through a barred access.

One advantage is to make available a printing apparatus that is usable at an entry or exit gap controlled by a bar.

One advantage is to facilitate the initial configuration of a barred access computerised control system that uses the printing apparatus.

Such objects and advantages, and still others, are achieved by the apparatus and by the method according to one or more of the claims set out below.

In one embodiment, a printing apparatus comprises a front port for inserting and expelling tickets, sensor means per reading a ticket inserted into said port, an input/output interface for connecting to at least one external device and printing means controlled by an electronic processor with a memory that contains a script including an instruction to activate said printing means in response to an input signal received through said interface. The script may include an instruction to activate said printing means in response to an input signal received from said sensor means and/or an instruction to send an output signal via said interface in response to a signal emitted by said sensor means.

The printing apparatus may perform its functions, or at least one part of its functions, without being connected to a central processor of the controlled access management system. The printing apparatus may also operate as a stand-alone system, without being connected in a computer network. The printing apparatus may be connected to a computer network. The printing apparatus, if networked, is seen and recognised by the remote system as a smart periphery.

The printing apparatus may require an installation, by the user. This installation may comprise, for example, inserting a software programme into the memory of the electronic control means integrated into the printing apparatus, in order to customise the various input/output functions to suit the needs and the features of the controlled access management system.

BRIEF DESCRIPTION OF THE DRAWINGS

The invention can be better understood and implemented with reference to the attached drawings that illustrate some embodiments thereof by way of non-limiting examples.

DETAILED DESCRIPTION

Figure 1:
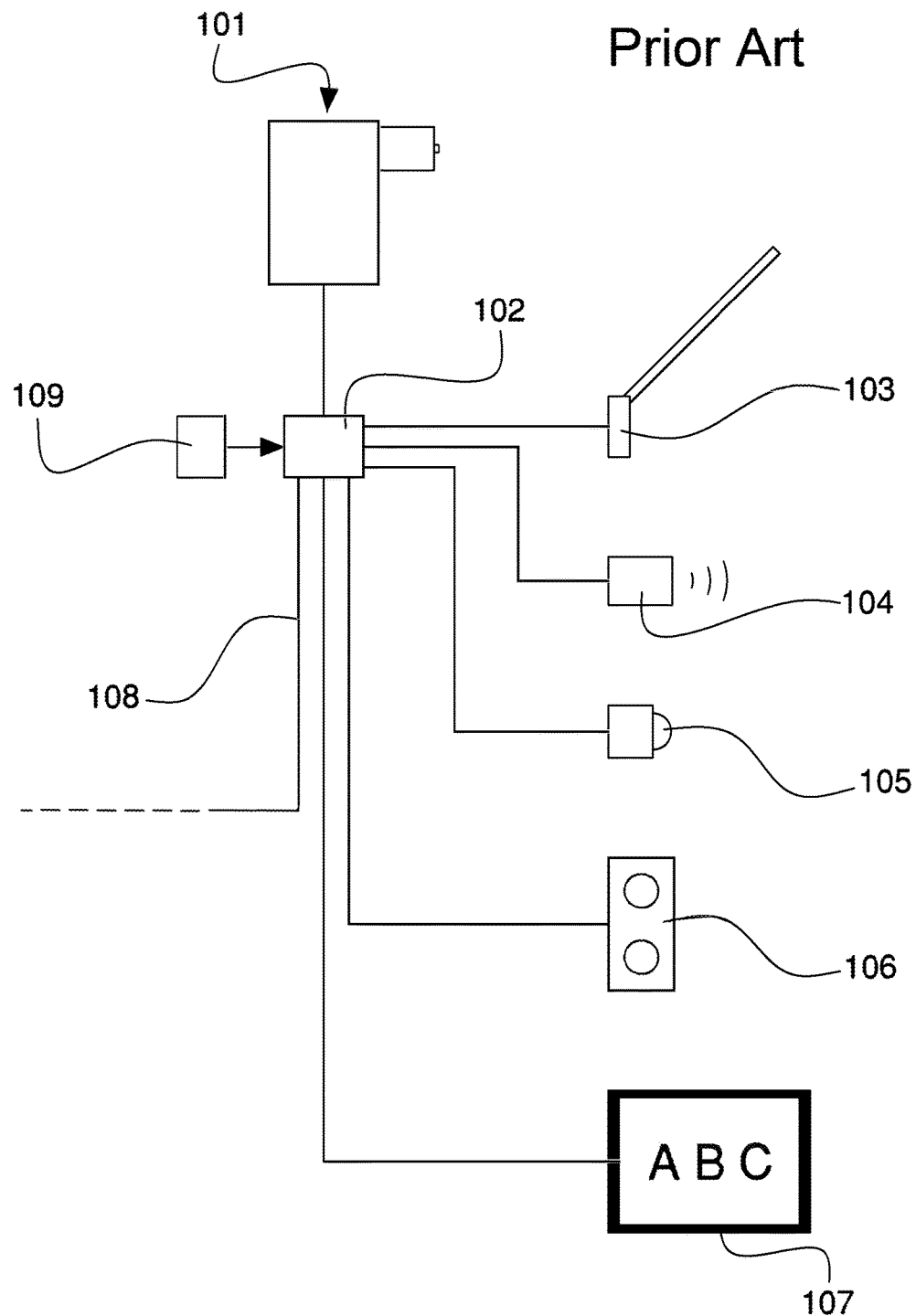
FIG. 1 shows a diagram of a management system of a controlled (barred) access of known type.

For the sake of simplicity, in the aforesaid figures identical elements have been indicated by the same numbering. With reference to FIG. 1, overall with 101 a printing apparatus has been indicated that is of known type and is for printing and validating tickets or receipts for a controlled access (for example a car park with bar). The prior art printing apparatus 101 is installed in a controlled access management system (which is also of known type) that comprises a programmable electronic processor 102 (for example a PLC or a dedicated electronic card) that is connected to various actuators and sensors of the management system. These actuators and sensors may comprise, in particular, a barring device 103 (for example a liftable bar) for closing or opening the access (for example the entrance or exit of a car park), a user presence sensor 104 (for example a sensor of the presence of a vehicle entering or exiting a car park), a user request sensor 105 (for example a pushbutton that is usable by a user for requesting a ticket at the entrance of a car park or a receipt at the exit thereof), a device 106 for conveying information to the user (for example a traffic light plant), a user interface 107 (for example a graphic interface comprising a display). The processor 102 may be connected, for example, to a computer network via a possible network connection 108. The controlled access management system is initially configured by introducing a set of data 109 comprising a group of computer programming instructions into the memory of the processor 102. Such instructions are implementable by the processor 102 to enable the controlled access management system to operate.

Figure 2:
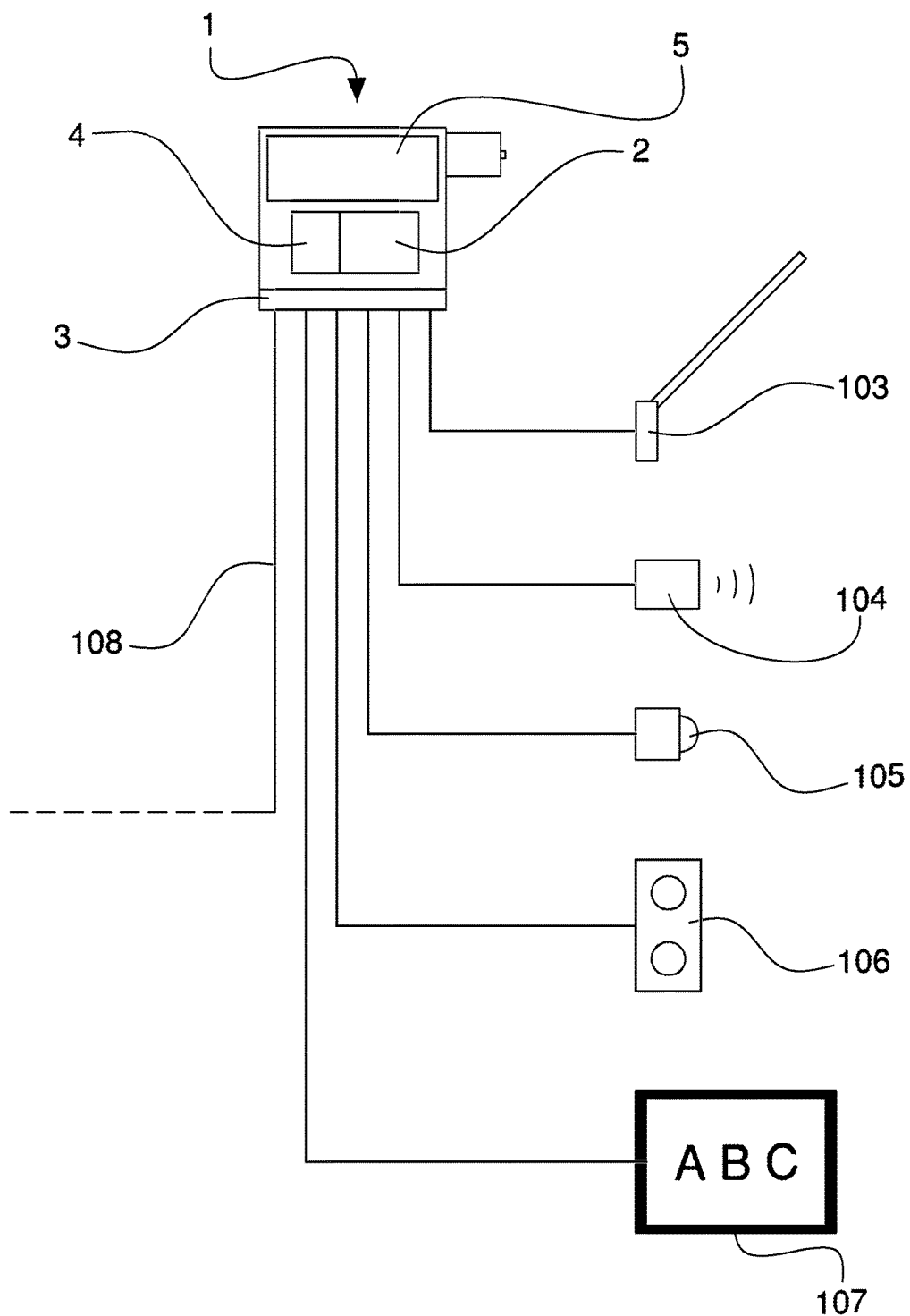
FIG. 2 shows a diagram of a management system of a controlled (barred) access operationally associated with an embodiment of a printing apparatus made according to the invention.

With reference to the aforesaid FIG. 2, with 1 a printing apparatus has been indicated that represents an embodiment of an apparatus made according to the present invention. The printing apparatus 1 is suitable for printing and validating tickets (for example thermal paper tickets).

The printing apparatus 1 may be associated, in particular, with a management system of a controlled (barred) access, for example for a car park. The printing apparatus 1 may be, for example, integrated into a parking column. The printing apparatus 1 may be configured, in particular, for managing the car park by means of parking permits in the form of printed tickets. The printing apparatus 1 may be arranged for emitting a parking pass (i.e. for printing the entry ticket to the car park) and for reading the parking pass (to validate the ticket at the exit from the car park).

The printing apparatus 1 may comprise at least one magazine for storing paper. The magazine may comprise a magazine of known type, for example a magazine for tickets in a fan-fold format or in a continuous module.

The printing apparatus 1 may comprise at least one ticket inlet/outlet port to enable a user to inset and/or remove a ticket. The port may be arranged on a front wall of the printing apparatus. The port may comprise a usual ticket inlet/outlet mouth. The port is intended, in use, to be arranged on a parking column so as to be easily accessible to a user.

The printing apparatus 1 may comprise printing means arranged for printing on the paper that comes from the aforesaid magazine and/or for printing on a ticket inserted into the aforesaid inlet/outlet port. This printing means may comprise printing means of known type, for example a thermal paper head. The printing means may be capable of, in particular, printing tickets with parking information (date, time of entry, name of car park, etc). The printing means may print barcodes, letters, numbers, symbols, etc.

The printing apparatus 1 may comprise supplying means arranged for supplying the printing means with the paper that comes from the magazine. This supplying means may comprise supplying means of known type, for example one or more paper-dragging rollers.

The printing apparatus 1 may comprise handling means arranged for withdrawing a ticket inserted into the port and/or for sending a ticket to the inlet/outlet port. This handling means may comprise handling means of known type, for example paper-dragging rollers.

The printing apparatus 1 may comprise first sensor means arranged for reading a ticket inserted into the port and/or for reading a ticket printed by the printing means. This first sensor means may comprise sensor means of known type, for example a CCD scanning sensor (a barcode reader).

The printing apparatus 1 may comprise second sensor means arranged for detecting the presence of a ticket in the aforesaid port. This second sensor means may comprise sensor means of known type, for example an (optical) sensor detecting the presence of paper. The printing apparatus 1 may comprise third sensor means (of known type) arranged for detecting a situation of lack of paper in the magazine.

The printing apparatus 1 may comprise control means 2 arranged for controlling the operations of the printing means, of the supplying means and of the handling means and for receiving signals from the sensor means (first, second, third sensor means). The control means 2 may be integrated into the printing apparatus 1. The control means 2 may comprise at least one programmable electronic card.

The printing apparatus 1 may comprise, in particular, a user interface 5 connected to the aforesaid control means. The user interface 5 may comprise, for example, at least one display.

The printing apparatus 1 may comprise an input/output interface 3 connected to the aforesaid control means 2.

The input/output interface 3 may comprise, in particular, at least one input/output port, for example an Ethernet port and/or a USB port.

The printing apparatus 1 may comprise at least one memory that is associated with the control means 2. The memory may be integrated into the electronic card. The memory may contain at least one script 4, i.e. one or more computer programming instructions written in a scripting language. In computing it is in fact known that the term script indicates a programme written in a particular class of programming language, called scripting language. The script 4 could comprise, in particular, a shell script (to be run inside a shell of an operating system). The shell script identifies a script for a text shell of an operating system, or the command-line interface. It is also known that, in information technology, a scripting language is an interpreted programming language and consists of a simple programme the purpose of which is the interaction with other more complex programmes (in which the most significant operations occur). The scripts are distinguished from the programs with which they interact, which are normally implemented in a different and non-interpreted language. It is also known that in information technology an interpreter is a programme that is able to run other programs directly from the corresponding source code, with the object of running a programme in a high level language, without previously compiling the language (object code), i.e. running the instructions in the used language, translating the instructions each time into instructions in machine language.

The script 4 inside the printing apparatus 1 may be used to control the actuators inside the printing apparatus 1 and/or to control the various peripheral units that are possibly connected to the apparatus.

The script 4 may comprise at least the instruction to activate at least one of the following devices of the apparatus: printing means, supplying means, handling means and user interface, in response to a given input signal received via the input/output interface 3.

The script 4 may comprise at least the instruction to send an outlet signal, via the input/output interface 3, in response to a given signal emitted by the first, second or third sensor means.

The script 4 may comprise at least the instruction to activate the user interface in response to a given signal emitted by the first, second or third sensor means.

The printing apparatus 1 may comprise at least one ticket housing zone not accessible by a user. This housing zone may be, in particular, of known type, for example an accumulating zone of special tickets, for example complimentary tickets arranged between the car park manager and businesses.

The aforesaid handling means may comprise ticket withdrawing means (of known type) arranged for sending a ticket, inserted into the port, to the aforesaid housing zone.

The script 4 may comprise at least the instruction to activate the withdrawing means in response to a given signal emitted by the first, second or third sensor means.

The script 4 may comprise at least the instruction to show a given page on the display in response to a given signal emitted by the first, second or third sensor means and/or in response to a given input signal received via the input/output interface 3.

The printing apparatus 1 may be used to run a management method for managing a controlled access.

The management method may comprise the step of connecting the printing apparatus 1 to at least one actuator and to at least one sensor of the management system. This connection may be run by the input/output interface 3.

This actuator may comprise at least one barring device 103, with at least one openable and closable barring member (for example of the liftable bar type) and/or a signalling device 106 (for example a traffic light plant). This sensor may comprise a user presence sensor 104 (for example to signal the presence of a vehicle) and/or a user request sensor 105, in particular with manual request means, for example of the electric pushbutton type (for requesting a ticket at the entrance of a car park or a receipt at the exit thereof).

The method may comprise the step of initially configuring the controlled access management system through inserting a set of data (management programme) into the electronic memory integrated into the control means 2 of the printing apparatus I. This set of data may comprise one or more specific programme instructions to be inserted into the script 4 or to be associated with the script 4.

The set of data may comprise a group of computer programming instructions. Such instructions are implementable by the control means to permit the operation of the controlled access management system. The set of data will, in this case, much simpler and more immediate to program than the set of data 109 used in the prior-art management system.

On the basis of the aforesaid set of data (management programme), in particular, a given output signal of an instruction of the script 4 has to correspond to a given drive signal of an actuator of the system and a given signal emitted by a sensor of the system has to correspond to a given input signal of an instruction of the script 4. The aforesaid set of data (management programme) may contain the desired instructions according to the features of the controlled access and according to the desired operating modes of the management system.

The printing apparatus 1 may require installation by a user. This installation may comprise, for example, inserting into the script 4 specific instructions for the programmable electronic control means 2 integrated into the printing apparatus 1, in order to customise the various input/output functions to suit the needs and the features of the controlled access management system.

The printing apparatus 1 may perform its functions, or at least a part thereof, without being connected to a central processor of the controlled access management system. It is nevertheless possible for the management method in question to comprise the step of connecting the printing apparatus 1 to a central programmable electronic processor of a management system of a controlled access. This connection may be run by the input/output interface 3. The central electronic processor may be connected to at least one actuator and to at least one sensor of the management system.

The printing apparatus 1 may be connected to a computer network via the network connection 108. The printing apparatus 1 may nevertheless also operate as a stand-alone system, i.e. without being connected to a computer network (in particular without having or without using the network connection 108). The printing apparatus 1, if connected to a computer network (remote system), may be seen and recognised by the remote system as a smart periphery.

The invention claimed is:

1. A printing apparatus comprising:
at least one paper magazine;
at least one ticket inlet/outlet port arranged for enabling a user to insert and remove a ticket;
printing means arranged for printing on the paper that comes from said magazine and/or for printing on a ticket inserted into said port;
supplying means arranged for supplying said printing means with the paper that comes from said magazine;
handling means arranged for withdrawing the ticket inserted into said port and/or for sending the ticket inserted to said port;
first sensor means arranged for reading the ticket inserted into said port and/or for reading a ticket printed by said printing means;
second sensor means arranged for detecting the presence and/or the absence of the ticket inserted in said port;
at least one programmable electronic card arranged for controlling the operations of said printing means, of said supplying means and of said handling means and for receiving signals from said first and second sensor means;
a user interface connected to said card;
an input/output interface connected to said card;
at least one memory that is associated with said card and contains at least one script that includes at least one instruction to activate at least one of said printing means, said supplying means, said handling means and said user interface in response to a given input signal received through said input/output interface;
at least one ticket housing zone not accessible by the user;
said handling means including ticket withdrawing means arranged for sending the ticket, inserted into said port, to said housing zone, said at least one script including at least one instruction to activate said withdrawing means in response to a given signal emitted by said first sensor means or by said second sensor means.

2. The printing apparatus according to claim 1, wherein said at least one script includes at least one instruction to send an outlet signal via said input/output interface in response to the given signal emitted by said first sensor means or by said second sensor means.

3. The apparatus according to claim 2, wherein said at least one script includes at least one instruction to activate said user interface in response to the given signal emitted by said first or second sensor means.

4. The printing apparatus according to claim 2, wherein said input/output interface includes at least one input/output port.

5. The printing apparatus according to claim 2, wherein said user interface includes at least one display and said script includes at least one instruction to show a page on the display in response to the given signal emitted by said first or second sensor means and/or in response to a given input signal received through said input/output interface.

6. The printing apparatus according to claim 2, wherein said at least one port includes a ticket inlet/outlet mouth.

7. The printing apparatus according to claim 1, wherein said at least one script includes at least one instruction to activate said user interface in response to the given signal emitted by said first or second sensor means.

8. The printing apparatus according to claim 7, wherein said input/output interface includes at least one input/output port.

9. The printing apparatus according to claim 7, wherein said user interface includes at least one display and said script includes at least one instruction to show a page on the display in response to the given signal emitted by said first or second sensor means and/or in response to a given input signal received through said input/output interface.

10. The printing apparatus according to claim 1, wherein said input/output interface includes at least one input/output port.

11. The printing apparatus according to claim 1, wherein said user interface includes at least one display and said script includes at least one instruction to show a page on the display in response to the given signal emitted by said first or second sensor means and/or in response to a given input signal received through said input/output interface.

12. The printing apparatus according to claim 1, wherein said at least one port includes a ticket inlet/outlet mouth.

13. The printing apparatus according to claim 1, said at least one memory being integrated into said card.

14. A control method for controlling a barred access by making use of a printing apparatus according to claim 1, said method including the steps of:
   connecting said printing apparatus to at least one actuator and to at least one sensor of said barred access via said input/output interface, in which said at least one actuator includes barring means and said at least one sensor includes manual command means,
   programming said card in such a manner that a given output signal of an instruction of said script corresponds to a given drive signal of said actuator and that a given signal emitted by said sensor corresponds to a given input signal of an instruction of said script.

15. A parking column comprising a printing apparatus including:
   at least one paper magazine;
   at least one ticket inlet/outlet port arranged for enabling a user to insert and remove a ticket;
   printing means arranged for printing on the paper that comes from said magazine and/or for printing on a ticket inserted into said port;
   supplying means arranged for supplying said printing means with the paper that comes from said magazine;
   handling means arranged for withdrawing the ticket inserted into said port and/or for sending the ticket inserted to said port;
   first sensor means arranged for reading the ticket inserted into said port and/or for reading a ticket printed by said printing means;
   second sensor means arranged for detecting the presence and/or the absence of the ticket inserted in said port;
   at least one programmable electronic card arranged for controlling the operations of said printing means, of said supplying means and of said handling means and for receiving signals from said first and second sensor means;
   a user interface connected to said card;
   an input/output interface connected to said card;
   at least one memory that is associated with said card and contains at least one script that includes at least one instruction to activate at least one of said printing means, said supplying means, said handling means and said user interface in response to a given input signal received through said input/output interface;
   at least one ticket housing zone not accessible by the user;
said handling means including ticket withdrawing means arranged for sending the ticket, inserted into said port, to said housing zone, said at least one script including at least one instruction to activate said withdrawing means in response to a given signal emitted by said first sensor means or by said second sensor means.

* * * * *